P. S. RYDBECK.
BALL RETAINER FOR RADIAL BALL BEARINGS.
APPLICATION FILED MAR. 21, 1918.

1,287,447.

Patented Dec. 10, 1918.

WITNESS:

INVENTOR:
Patrik Samuel Rydbeck
By Attorneys,

UNITED STATES PATENT OFFICE.

PATRIK SAMUEL RYDBECK, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

BALL-RETAINER FOR RADIAL BALL-BEARINGS.

1,287,447.  Specification of Letters Patent.  Patented Dec. 10, 1918.

Application filed March 21, 1918.  Serial No. 223,806.

*To all whom it may concern:*

Be it known that I, PATRIK SAMUEL RYDBECK, a subject of the King of Sweden, residing at Gottenborg, in the Kingdom of Sweden, have invented certain new and useful Improvements in Ball-Retainers for Radial Ball-Bearings, of which the following is a specification, reference being had to the drawings accompanying and forming a part thereof.

This invention relates to ball retainers for radial ball bearings in which the ball pressures are directed obliquely in relation to the axis of rotation of the bearing.

In ball bearings of this kind, such as, for instance, in double row ball bearings having a spherical outer race, ball retainers have been used having laterally open pockets of substantially cylindrical form made by boring or pressing, the bottoms of the said pockets being rounded or conical in shape. In hitherto known ball retainers of this kind, the said pockets have always been made so that their axes or center lines are parallel to the axis of rotation of the bearing. Since, however, in a ball bearing in which the pressure is directed obliquely in relation to the axis of the bearing, the rotation of a ball takes place about an axis which is substantially perpendicular to the direction of the pressure so as to form an angle with the axis of the ball pocket, the contact of the ball with the side walls and the bottom of the pocket will be unsymmetrical in relation to the axis of rotation of the ball, which disadvantageously affects the rolling movement of the ball and causes the friction to be increased.

This invention has for its object to remove the said drawbacks and it consists in that the ball pockets have such a direction that their axes or center lines are perpendicular or substantially perpendicular to the ball pressure, i. e. coincide with the axes of rotation of the balls.

Figure 1:
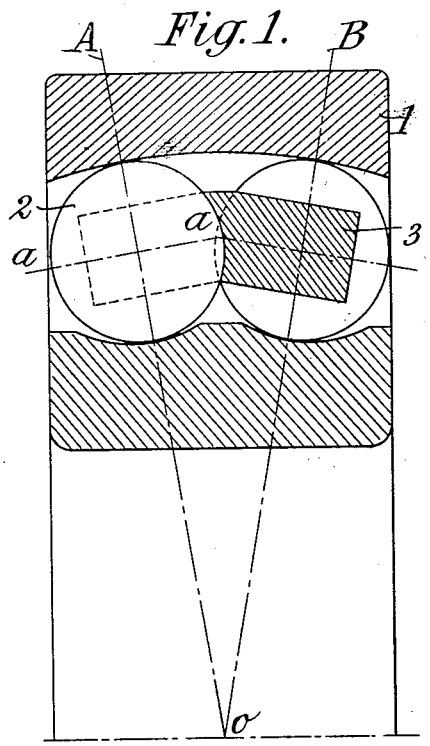
Figure 3:
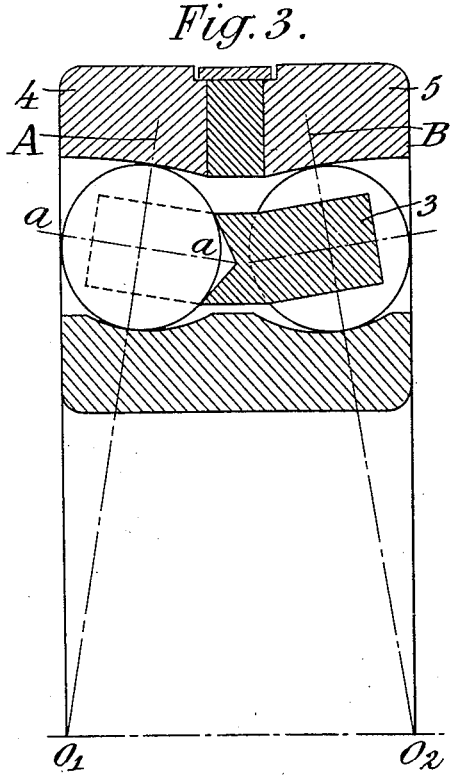
Figure 2:
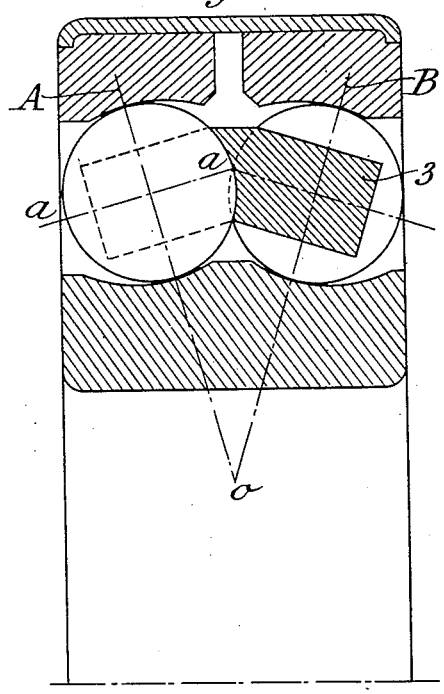

In the drawings, different forms of embodiment of the invention are shown. Fig. 1 is an axial section of part of a double row self-alining ball bearing having a spherical outer race, and provided with a ball retainer according to the invention. Fig. 2 is a similar view of a double row ball bearing having grooves in both rings causing obliquely directed ball pressures, and provided with a slightly modified form of a ball retainer according to the invention. Fig. 3 is a view, similar to Figs. 1 and 2, of a double row ball bearing having outwardly inclined ball pressures, and provided with a ball retainer according to the invention.

In the ball bearing shown in Fig. 1, the ball pressure is directed along the radii O—A and O—B passing from the center of the spherical outer race through the points of contact of the balls with the outer bearing ring 1. The axis of rotation $a$—$a$ of a ball 2 is substantially perpendicular to the direction O—A of the ball pressure. The ball retainer 3 is provided with laterally open, bored pockets the axes or center lines of which coincide with the axes of rotation of the balls, respectively. The cross-section of the ball retainer is, preferably, roof-shaped, as shown, or curved.

In the ball bearing shown in Fig. 2, the directions O—A and O—B of the ball pressure have a greater inclination relatively to the axis of the bearing than in the bearing shown in Fig. 1. The axes of the ball pockets are accordingly inclined so that the said axes are also in this case perpendicular to the directions of the pressure. In other respect, however, the form of the ball retainer is substantially similar to that of Fig. 1.

In Fig. 3, the invention is shown applied to a double row ball bearing of a known type, in which the outer bearing ring is made of two separate race rings 4 and 5, respectively, having spherical races the centers $O_1$ and $O_2$ of which lie on the axis of the bearing at such a distance from each other that the ball pressures will be inclined outwardly, measured from the center plane of the bearing. The ball retainer is accordingly formed so that the axes of its bored pockets coincide with the axes of rotation of the balls.

The invention is also applicable in ball retainers of pressed sheet metal having laterally open pockets for the balls.

What I claim is:—

1. A ball retainer for radial ball bearings having obliquely directed ball pressures, in which the balls are arranged in laterally open pockets of substantially cylindrical form, the axes or center lines of the said ball pockets being perpendicular or substantially perpendicular to the direction of the ball pressures.

2. A ball retainer for double row radial ball bearings having obliquely directed ball pressures, the cross-section of which is roof-shaped or curved and in which the balls are arranged in laterally open pockets of substantially cylindrical form, the axes or center lines of the said ball pockets being perpendicular or substantially perpendicular to the directions of the ball pressures.

In testimony whereof I affix my signature.

PATRIK SAMUEL RYDBECK.